April 21, 1959          H. B. DAWSON          2,883,231
CONVERTIBLE VEHICLE AND FREIGHT CARRIER
Filed April 8, 1955          2 Sheets-Sheet 1
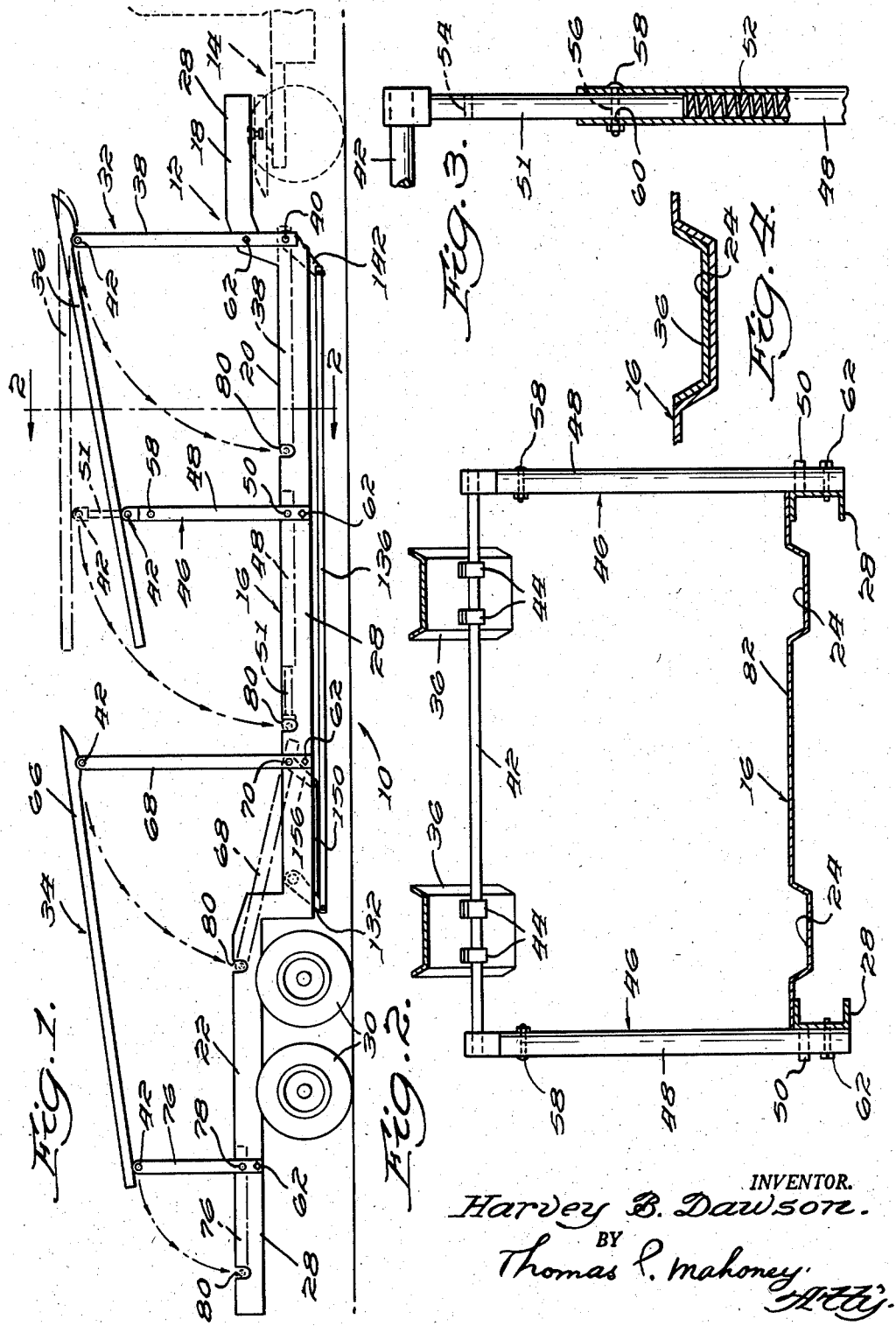
INVENTOR.
Harvey B. Dawson.
BY Thomas P. Mahoney.
Atty.

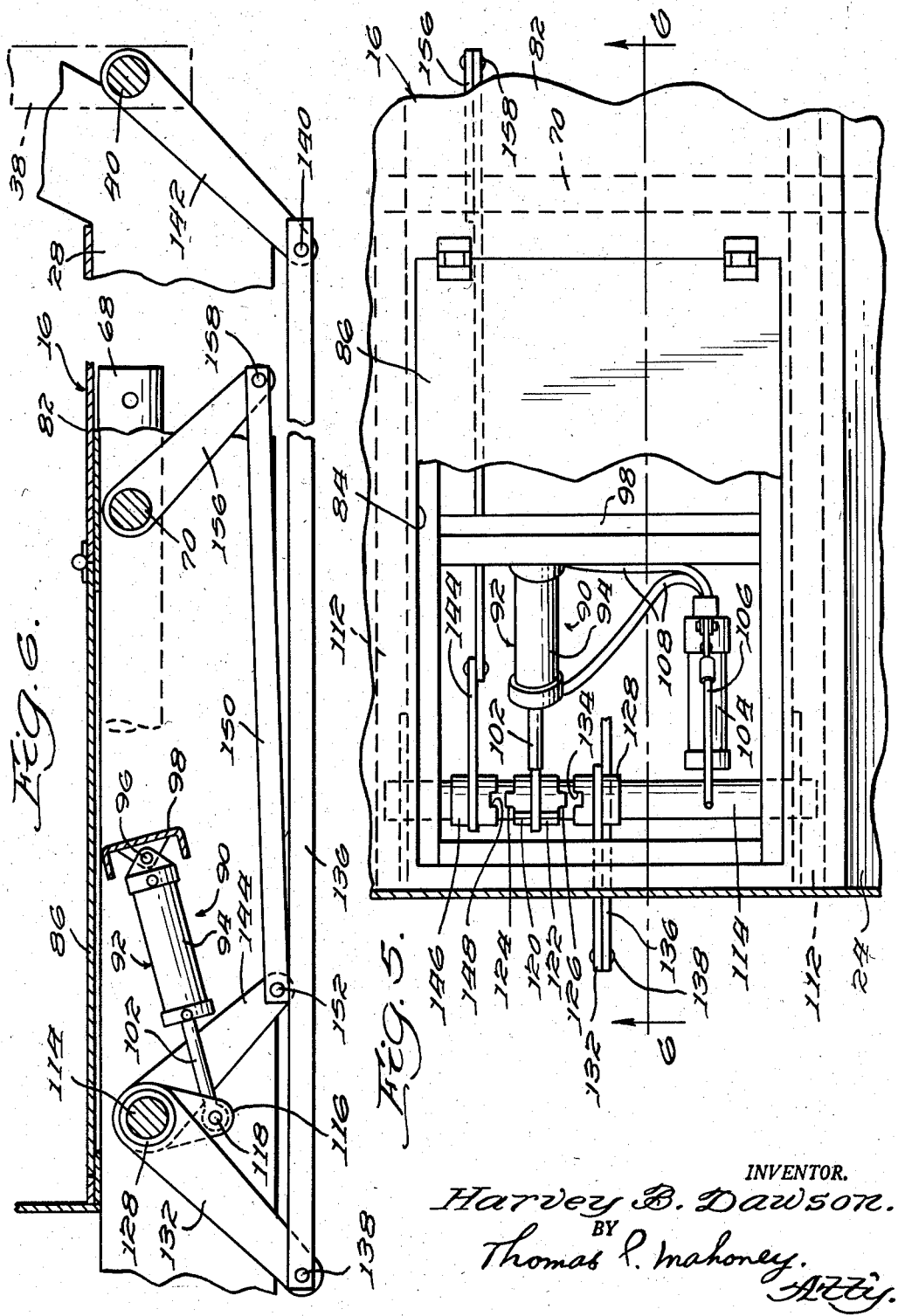

United States Patent Office 2,883,231
Patented Apr. 21, 1959

2,883,231
CONVERTIBLE VEHICLE AND FREIGHT CARRIER

Harvey B. Dawson, El Monte, Calif.

Application April 8, 1955, Serial No. 500,088

5 Claims. (Cl. 296—1)

This invention relates to a vehicle carrier of the type utilized in carrying automobiles and trucks from the factory to dealers and has particular reference to vehicle carriers of the convertible type which can be utilized on the return trip to the place of origin as freight carriers when vehicles are not available for shipment to the point of origin.

One of the major problems encountered by operators of fleets of vehicle carriers is the fact that frequently the carriers will leave the point of origin with a full load of vehicles but will have to return from the place of delivery empty, thus materially increasing the costs of operation of the vehicle carriers.

It is, therefore, an object of my invention to provide a vehicle carrier which is designed for use in carrying vehicles and, when vehicle loads are not available, for carrying freight. In order to accomplish the conversion of the vehicle carrier from a vehicle carrying to freight carrying condition, I provide a plurality of pivotally mounted ramp means on the bed of the carrier which are movable between first, lower, inoperative positions in nesting position on said bed, and second, upper, operative positions wherein they are raised above said bed to support vehicles thereupon and to permit vehicles to be received upon said bed therebelow.

Therefore, when vehicles are being carried by the vehicle carrier of my invention, the ramp means of the carrier are raised into their upper positions wherein vehicles are supported thereupon. However, when a vehicle load is not available and it is desired to utilize the carrier in conveying freight of various types, the ramp means are pivotally lowered into nesting relationship with the bed of the carrier so that freight may be loaded thereupon.

An additional object of my invention is the provision of a vehicle carrier of the aforementioned convertible type which includes motive power means designed to facilitate the movement of the ramp means of the carrier between operative and inoperative positions so that there is no necessity for extreme manual effort encountered in prior art devices for changing the carrier from vehicle carrying to freight carrying condition.

Another object of my invention is the provision of a vehicle carrier of the aforementioned type wherein the motive power means provided in the vehicle carrier is alternatively connectible to any one of the ramp means on the carrier so that particular ramp means may be moved between operative and inoperative positions.

A further object of my invention is the provision, in a vehicle carrier of the convertible type, of locking means for maintaining the ramp means in upper, operative positions with respect to the bed of the carrier so that vehicles may be supported upon said ramp means when they are located in said upper, operative positions.

An additional object of my invention is the provision of a vehicle carrier of the convertible type wherein the conversion from vehicle to freight carrying condition occupies a minimum of time and can be accomplished with practically no effort upon the part of the driver of the carrier. Furthermore, I desire to provide a convertible vehicle carrier which does not entail the use of additional component parts which have to be mounted or demounted in operative relationship with or from the bed of the vehicle carrier.

Other objects and advantages of my invention will be apparent from the following specification and the accompanying drawings which are for the purpose of illustration only and in which:

Fig. 1 is a side elevational view of a convertible vehicle carrier constructed in accordance with my invention;

Fig. 2 is a vertical sectional view taken from the broken line 2—2 of Fig. 1;

Fig. 3 is an enlarged sectional view of one of the supporting arms incorporated in the ramp means of the carrier;

Fig. 4 is a transverse sectional view showing the internesting relationship between a portion of the ramp means and a trough in the bed of the carrier when the ramp means is located in its lower, inoperative position;

Fig. 5 is an enlarged, fragmentary view showing the motive power means and a portion of the connecting means for connecting said motive power means to the ramp means of the carrier; and Fig. 6 is a longitudinal sectional view taken on the broken line 6—6 of Fig. 5.

Referring to the drawings and particularly to Fig. 1 thereof, I show a convertible vehicle carrier 10 constructed in accordance with the teachings of my invention and embodied in an elongated trailer-type vehicle 12 which is adapted to be drawn by a tractor 14. Although I show my invention as embodied in a trailer-type vehicle 12, it is, of course, not intended to limit the principles of the invention to any type of vehicle since they can obviously be incorporated in other than trailer type vehicles.

The trailer-type vehicle 12 is provided with an elongated bed 16 which has a raised front portion 18, an intermediate depressed portion 20, and a raised rear portion 22. The bed 16 is provided in both the depressed and raised rear portions 20 and 22 thereof, respectively, with elongated vehicle wheel receiving troughs 24 which are designed to receive the wheels of vehicles being carried on the bed 16. The bed 16, as best shown in Figs. 1 and 2 of the drawings, is provided with elongated structural side beams 28 and the entire bed is supported on wheels 30 which permit the trailer-type vehicle 12 to be towed from place to place by the tractor 14.

Pivotally supported upon the forward extremity of the bed 16 is first forward ramp means 32 which is movable between a lower, inoperative position and an upper, operative position, in a manner to be described in greater detail below. Second rearward ramp means 34 are pivotally mounted on the rearward extremity of the bed 16 and are movable in the same manner as the first ramp means between inoperative and operative positions.

The first ramp means 32 is constituted by a pair of laterally spaced, trough-shaped ramp members 36, the forward ends of which are pivotally supported upon the upper extremities of a laterally spaced pair of supporting arms 38, the lower extremities of which are secured to the opposite ends of an actuating shaft 40 which is, in turn, mounted for rotation in the side beams 28 of the bed 16.

The forward ends of the ramp members 36 are connected to the upper extremities of the supporting arms 38 by means of supporting rods 42 which extend transversely between said upper extremities. The undersides of the ramp members 36 are, as best shown in Fig. 2 of the drawings, provided with mounting clips 44 for pivotally securing said ramp members in operative relationship with the supporting rods 42.

The rearward ends of the ramp members 36 are pivotally supported upon a supporting rod 42 by means of mounting clips 44 and the opposite ends of said supporting rods are journaled in the upper ends of a pair of rearward supporting arms 46, as best shown in Figs. 1 and 2 of the drawings. The lower extremities of the rearward supporting arms 46 are constituted by elongated tubular members 48, said tubular members being pivotally mounted by means of pivot pins 50 on the side beams 28 of the bed 16.

The upper ends of the rearward supporting arms 46 are constituted by substantially cylindrical rods 51, as best shown in Fig. 3 of the drawings, which are disposed in telescopic relationship with the tubular members 48 and which have their lower extremities engaging the upper end of compression springs 52 located in said tubular members, as best shown in Fig. 3 of the drawings. Upper and lower transverse bores 54 and 56 are respectively provided in the rods 51 and are engageable by bolts 58 extending through openings 60 in the walls of the tubular members 48.

The telescoping rod 51 and the tubular member 48 in each of the rearward supporting arms 46 constitute an expansion joint, for a purpose which will be described in greater detail below. When the first ramp means 32 is disposed in the upper operative position shown in Figs. 1 and 2 of the drawings with a vehicle disposed thereupon, the forward and rearward supporting arms 38 and 46 are maintained in vertical positions by means of lock pins 62 which extend through openings provided in the lower extremities of the arms 38 and 46 and into corresponding openings in the side beams 28 of the bed 16. The locking means constituted by the lock pins 62 thus prevents the weight of a vehicle on the first forward ramp means 32 from causing the first ramp means 32 to be moved from operative to inoperative positions.

The second rearward ramp means 34 includes a pair of laterally spaced ramp members 66, the forward extremities of which are connected by means of a transversely oriented rod 42 to the upper extremities of a pair of forward supporting arms 68. The lower extremities of the supporting arms 68 are secured for rotation with respect to the bed 16 on the opposite ends of an actuating shaft 70, said opposite ends being also journaled for rotation in the side beams 28 of the bed 16. The rearward extremities of the ramp members 66 are pivotally mounted by means of transversely oriented rod 42 to the upper extremities of a pair of rearward supporting arms 76 which are mounted for rotation on pivot pins 78 secured in the side beams 28 of the bed 16.

Both the forward supporting arms 68 and the rearward supporting arms 76 can be maintained in vertical orientation by means of lock pins 62 in the same manner as the forward and rearward supporting arms 38 and 46, respectively, of the first forward ramp means 32.

Spaced pairs of sockets 80 are provided in the side beams 28, as best shown in Fig. 1 of the drawings, for the reception of the transversely oriented supporting rods 42 of the ramp members 36 and 66 of the first and second ramp means 32 and 34, respectively, when the ramp members 36 and 66 are disposed in their inoperative, lower positions wherein they are internested with the elongated vehicle wheel receiving troughs 24 formed in the bed 16. Since the sockets 80 receive the transversely oriented supporting rods 42 for the ramp members 36 and 66, the ramp members 36 and 66 can be positioned flush with the bottom of the bed 16 and thus the load of freight placed upon the bed will not be borne by the ramp members 36 and 66, but by the bed 16 itself.

The bed 16, as best shown in Fig. 2 of the drawings is provided with a flat elongated intermediate portion 82. Disposed below the intermediate portion 82 and accessible through an opening 84 which is normally closed by a door 86 is motive power means 90 for moving the first and second ramp means 32 and 34 between operative and inoperative positions and between inoperative and operative positions.

The motive power means 90 in the present embodiment of my invention is constituted by a hydraulic jack 92. Although I show the utilization of a hydraulic jack 92 as the motive power means of my invention, it is, of course, readily apparent that other equally effective motive power means, such as electric motors and the like, might be substituted therefor.

The hydraulic jack 92 includes a cylinder 94 which is pivotally connected, as at 96, to a transversely oriented frame member 98 extending across the underside of the bed 16. A piston rod 102 is extensible or retractable from or into the cylinder 92 by the action of a hydraulic force pump 104 which is energizable by means of a handle 106 and which is connected to the cylinder by lines 108, as best shown in Fig. 5 of the drawings.

Supported between frame members 112 on the underside of the bed 16 is a supporting rod 114, said supporting rod 114, as best shown in Figs. 5 and 6 of the drawings, having a driving crank member 116 mounted thereupon for rotation relative thereto. The outermost end of the piston rod 102 is pivotally secured by a pivot pin 118 to the lowermost extremity of the driving crank 116, the upper extremity of which is connected by means of a spline 120 to a clutch collar 122 which is laterally shiftable on the periphery of the supporting rod 114. The clutch collar 122 is provided with oppositely oriented axially extending lugs 124 and 126.

Supported on the supporting rod 114 by a collar 128 for rotation relative to said supporting rod is a first driven crank 132. The collar 128 is, as best shown in Fig. 5 of the drawings, provided with an opening 134 for the reception of the juxtaposed lug 126 on the axially and laterally shiftable clutch collar 122. Therefore, when the lug 126 engages the opening 134 because of the lateral shifting of the clutch collar 122, energization of the hydraulic jack 92 to cause the extension of the piston rod 102 from the cylinder 94 thereof will cause simultaneous rotation of the first driven crank 132 to cause longitudinal movement of an elongated tie rod 136 in a left-hand direction, as seen in the drawings Figs. 1 and 6, because of the pivotal connection of the rearward end of the tie rod 136 to the lower extremity of the first driven crank by means of a pivot pin 138.

The forward end of the tie rod 136 is, as best shown in Figs. 1 and 6 of the drawings, connected by means of a pivot pin 140 to the lower extremity of a crank 142 which is fastened securely to the periphery of the actuating shaft 40 and which thus causes rotation of the forward arms 38 secured thereto. A second driven crank 144 is, as best shown in Figs. 1, 5, and 6 of the drawings, mounted for rotation on a collar 146 with respect to the supporting rod 114, said collar having an opening 148 therein for the reception of the lug 124 on the clutch collar 122.

Therefore, when the clutch collar 122 is moved to engage the lug 124 thereupon in the opening 148 in the collar 146, rotation of the second driven crank 144 with respect to the supporting rod 114 will take place to shift a second tie rod 150 to the right or left, as seen in Figs. 5 and 6 of the drawings. The movement of the tie rod 150 is caused because of a pivotal connection at 152 of said tie rod 150 to the lower extremity of the second driven crank 144. Longitudinal movement of the second tie rod 150 will cause concomitant movement of a crank 156 which is fastened to the actuating shaft 70 for the forward supporting arm 68 of the second ramp means 34. The forward extremity of the second tie rod 150 is connected to the crank 156 by means of a pivot pin 158.

During the process of loading the vehicle carrier 10 with vehicles, the second rearward ramp means 34 is permitted to remain in the lower inoperative position wherein the supporting arms 68 and 76 thereof overlie the side beams 28 of the bed 16 in the manner shown in Fig. 1 of the drawings with the transversely oriented supporting rods 42 disposed in the longitudinally spaced sockets 80 in the side beams 28 of the bed 16. However, the first forward ramp means 32 is located in the operative position shown in Fig. 1 of the drawings by the engagement of the clutch collar 122 with the collar 128 and the energization of the hydraulic jack 92 to cause the movement of the tie rod 136 to the left and the clockwise rotation of the crank 142 to cause the forward and rearward pairs of supporting arms 38 and 46 to be raised into their vertical positions to maintain the ramp members 36 in their upper operative positions.

It will be noted that, during the movement of the forward supporting arms 38, the connection of said arms to the rearward supporting arms 46 through the ramp members 36 is what causes the movement of the rearward supporting arms 46. Furthermore, since the ramp members 36 are normally maintained in the inclined position shown in full lines in Fig. 1 of the drawings, it is necessary to provide the expansion joint constituted by the rod 51 and the tubular member 48 so that the arm 46 can travel through the arc necessary to be permitted to be raised into the position shown at dotted lines 36 in Fig. 1 of the drawings. During such movement, the spring 52 urges the rod into its outermost position and the bolt 58 is passed through the lower bore 56 in the rod 51 and through the mating opening 60 in the tubular member 48 so the expansion joint is fully opened.

However, when the ramp means 32 reaches its upper operative position, the ramp members 36 can be moved downwardly into the full line position shown in Fig. 1 of the drawings after a car or other vehicle has been driven onto the bed 16 under the ramp members 36. When the ramp members 36 are moved downwardly against the action of the spring 52 into the full line position shown in Fig. 1 of the drawings, the bolt 58 engages the upper bore 54 and maintains the expansion joint in the closed position.

The second ramp means 34 is then raised by the action of the motive power means 90 causing the clockwise rotation of the crank 156 to raise the supporting arms 68 and 76. The rearward ends of the ramp members 66 can be temporarily disconnected from operative relationship with the upper extremities of the supporting arms 76 by the removal of the supporting rod 42 to permit a car or other vehicle to be driven backwards onto the bed 16 into a position in which the rear wheels thereof are received in the intermediate portion of the bed and the forward wheels thereof are received on the raised rearward portion 22 of the bed 16. A car or other vehicle is then driven by the use of demountable ramp means onto the ramp members 66 of the second ramp means 34 and lock pins 62 are then driven into the lower extremities of the supporting arms 38, 48, and 68 and 76 to maintain the ramp means 32 and 34 in their upper operative positions.

After the vehicles have been delivered to their destination, if no return load of vehicles is available the ramp means 32 and 34 are kept in the lower inoperative positions and the bed 16 can be used for the transportation of freight other than vehicles.

I claim as my invention:

1. In a convertible vehicle carrier, the combination of: an elongated vehicle carrying bed; a single motive power means mounted on said bed; first ramp means pivotally mounted upon the forward portion of said bed and movable between an upper operative and a lower inoperative position; second ramp means pivotally mounted upon the rearward portion of said bed and movable between an upper operative and a lower inoperative position; first connecting means between said first ramp means and said motive power means; second connecting means between said second ramp means and said motive power means; and a clutch for alternatively connecting said first and second connecting means to said motive power means.

2. In a convertible vehicle carrier, the combination of: an elongated vehicle carrying bed; first ramp means pivotally mounted upon said bed, said first ramp means including a pair of laterally spaced ramp member supported at their forward and rearward extremities by longitudinally spaced pairs of supporting arms whose lowermost extremities are pivotally connected to said bed, the arms of one of said pairs having their lowermost extremities operatively secured to each other by a transversely oriented member extending transversely of said bed; second ramp means pivotally mounted upon said bed, said second ramp means including a pair of laterally spaced ramp members supported at their forward and rearward extremities by longitudinally spaced pairs of supporting arms whose lowermost extremities are pivotally connected to said bed, the arms of one of said pairs having their lowermost extremities operatively secured to each other by a transversely oriented member extending transversely of said bed; and single energizing means on said bed connectible alternatively to said transversely oriented members of said first and second ramp means to shift said ramp means between lower, inoperative positions and upper, operative positions.

3. In a convertible vehicle carrier, the combination of: an elongated vehicle carrying bed; first ramp means pivotally mounted upon said bed, said first ramp means including a pair of laterally spaced ramp members supported at their forward and rearward extremities by longitudinally spaced pairs of supporting arms whose lowermost extremities are pivotally connected to said bed, the arms of one of said pairs having their lowermost extremities operatively secured to each other by a transversely oriented member; second ramp means pivotally mounted upon said bed, said second ramp means including a pair of laterally spaced ramp members supported at their forward and rearward extremities by longitudinally spaced pairs of supporting arms whose lowermost extremities are pivotally connected to said bed, the arms of one of said pairs having their lowermost extremities operatively secured to each other by a transversely oriented member; means on said bed connectible alternatively to said transversely oriented members of said first and second ramp means to shift said ramp means between lower, inoperative positions and upper, operative positions; and locking means for securing certain of said arms of said first and second ramp means to said bed to maintain said first and second ramp means in said upper, operative positions.

4. In a convertible carrier for vehicles and freight, the combination of: an elongated vehicle carrying bed; forward and rearward vehicle supporting ramp means pivotally connected to said bed for movement between upper, operative and lower, inoperative positions; motive power means mounted below said bed and intermediate the extremities thereof; and connecting means for alternatively connecting said forward or rearward ramp means to said motive power means to move said ramp means between operative and inoperative positions, said connecting means including a clutch operatively connected to said motive power means and a crank and tie-rod connector between said clutch and the pivotal connection of each of said ramps.

5. In a convertible carrier for vehicles and freight, the combination of: an elongated vehicle carying bed; forward and rearward vehicle supporting ramp means pivotally connected to said bed for movement between upper, operative and lower, inoperative positions; motive power means mounted below said bed intermediate the extremities thereof; connecting means for alternatively connecting said forward or rearward ramp means to said motive power means to move said ramp means between operative and inoperative positions, said connecting means including a clutch operatively connected to said motive power means and a crank and tie-rod connector between said clutch and the pivotal connection of each of said ramps; and means for locking said ramp means to said bed in said upper, operative positions.

References Cited in the file of this patent

UNITED STATES PATENTS

| | | |
|---|---|---|
| 800,168 | Morgan | Sept. 26, 1905 |
| 2,022,375 | Judd | Nov. 26, 1935 |
| 2,587,456 | Francis | Feb. 26, 1952 |
| 2,611,640 | Francis | Sept. 23, 1952 |

FOREIGN PATENTS

| | | |
|---|---|---|
| 653,712 | Great Britain | May 23, 1951 |